United States Patent [19]

Thomas et al.

[11] 4,412,233

[45] Oct. 25, 1983

[54] INK EVAPORATION PREVENTION MEANS FOR INK JET PRINT HEAD

[75] Inventors: Jacob E. Thomas, Ithaca; James K. McKnight, Trumansburg, both of N.Y.

[73] Assignee: NCR Corporation, Dayton, Ohio

[21] Appl. No.: 385,956

[22] Filed: Jun. 7, 1982

[51] Int. Cl.³ .............................................. G01D 15/16

[52] U.S. Cl. .................................................. 346/140 R

[58] Field of Search .......................... 346/1.1, 75, 140; 239/102, 103

[56] References Cited

U.S. PATENT DOCUMENTS 3,298,030 1/1967 Lewis et al. .......................... 346/75

3,900,866 8/1975 Bell et al. .................... 346/140 R X 4,281,329 7/1981 Yano et al. .................. 346/75 X R

FOREIGN PATENT DOCUMENTS 1279673 11/1961 France ............................... 346/140

53-108433 9/1978 Japan .................................... 346/75

*Primary Examiner*—Donald A. Griffin

*Attorney, Agent, or Firm*—J. T. Cavender; Wilbert Hawk, Jr.; George J. Muckenthaler

[57] ABSTRACT

An ink-carrying conduit connected between an ink reservoir and a print head is placed within an enclosure for a portion of its length and which enclosure is an extension of the reservoir in large tubular form to contain the conduit in an ink vapor atmosphere.

24 Claims, 1 Drawing Figure

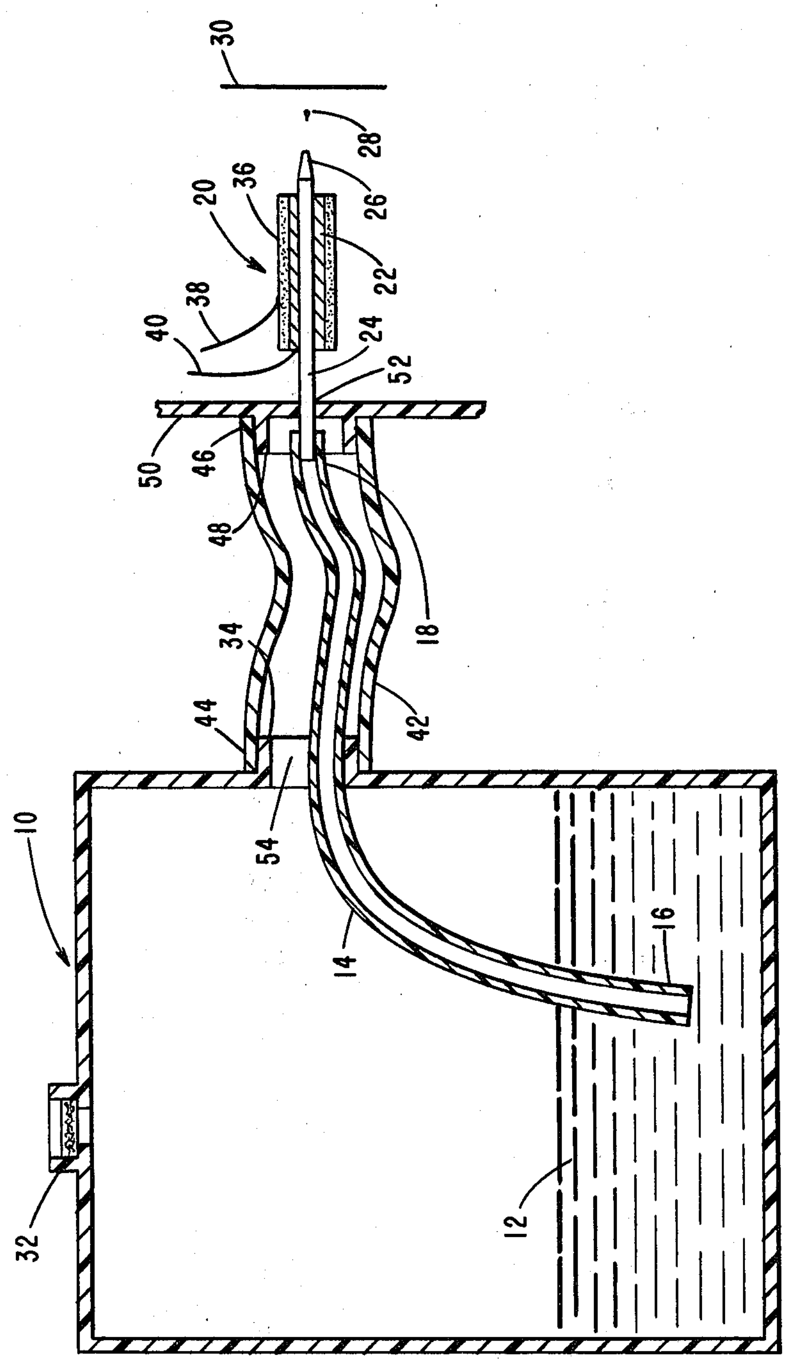
30
28
26
20
36
22
38
40
24
52
50
46
48
18
34
44
42
10
54
14
16
32
12

INK EVAPORATION PREVENTION MEANS FOR INK JET PRINT HEAD

CROSS-REFERENCE TO RELATED APPLICATIONS

Ink Level Control For Ink Jet Printer, co-pending application Ser. No. 385,965, filed June 7, 1982, invented by Jacob E. Thomas, and assigned to NCR Corporation.

Ink Level Control For Ink Jet Printer, co-pending application Ser. No. 385,955, filed June 7, 1982, invented by Richard G. Bangs and Jacob E. Thomas, and assigned to NCR Corporation.

Ink Control For Ink Jet Printer, co-pending application Ser. No. 385,966, filed June 7, 1982, invented by Jacob E. Thomas, and assigned to NCR Corporation.

Ink Control For Ink Jet Printer, co-pending application Ser. No. 385,967, filed June 7, 1982, invented by Jacob E. Thomas, and assigned to NCR Corporation.

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is well-known, the impact operation depends upon the movement of impact members, such as print hammers or wires or the like, which are typically moved by means of an electromechanical system and which may, in certain applications, enable a more precise control of the impact members.

The advent of non-impact printing, as in the case of thermal printing, brought out the fact that the heating cycle must be controlled in a manner to obtain maximum repeated operations. Likewise, the control of ink jet printing, in at least one form thereof, must deal with rapid starting and stopping movement of the ink fluid from a supply of the fluid. In each case of non-impact printing, the precise control of the thermal elements and of the ink droplets is necessary to provide for both correct and high-speed printing.

In the matter of ink jet printing, it is extremely important that the control of the ink droplets be precise and accurate from the time of formation of the droplets to depositing of such droplets on paper or like record media and to make certain that a clean printed dot-matrix character results from the ink droplets. While the method of printing with ink droplets may be performed in either a continuous manner or in a demand pulse manner, the latter type method and operation is disclosed and is preferred in the present application when applying the features of the present invention. The drive means for the ink droplets is generally in the form of a well-known crystal or piezoelectric type element to provide the high-speed operation for ejecting the ink through the nozzle while allowing time between droplets for proper operation. The ink nozzle construction must be of a nature to permit fast and clean ejection of ink droplets from the print head.

In the ink jet printer, the print head structure may be a multiple nozzle type with the nozzles aligned in a vertical line and supported on a print head carriage which is caused to be moved or driven in a horizontal direction for printing in line manner.

Alternatively, the printer structure may include a plurality of equally-spaced, horizontally aligned, single nozzle print heads which are caused to be moved in back-and-forth manner to print successive lines of dots in making up the lines of characters. In this latter arrangement, the drive elements or transducers are individually supported along a line of printing.

In a still different structure, the nozzles are spaced in both horizontal and vertical directions, and the vertical distance between centers of the ink jets would equal the desired vertical distance between one dot and the next adjacent dot above or below the one dot on the paper. The horizontal distance is chosen to be as small as mechanically convenient without causing interference between the actuators, reservoirs, and feed tubes associated with the individual jets. The axes of all jets are aligned approximately parallel to each other and approximately perpendicular to the paper. Thus, if all nozzles were simultaneously actuated, a sloped or slanted row of dots would appear on the paper and showing the dots spaced horizontally and vertically. In order to produce a useful result consisting of dots arranged as characters, it is necessary to sweep the ink jet head array back and forth across the paper, and actuating each individual nozzle separately when it is properly located to lay down a dot in the desired position. A vertical row of dots is created by sequentially actuating the nozzles rather than simultaneous actuation which is the preferred practice in the more common nozzle arrangements.

A further observation in ink jet printers is that previous and current designs for drop-on-demand ink jet print heads are sensitive to the ingestion of air into or the presence of air in the supply of ink. Even a small air bubble can interrupt or fault the performance of transducers or like devices that expel ink droplets from a nozzle by means of pressure pulses created within an ink-filled chamber or channel.

Additionally, in an ink jet printer, it is important that the ink is maintained in a condition which allows the ink droplets to dry upon contact with the record media so as to avoid smearing of the ink, but at the same time, it is necessary to keep the ink droplets in a wet condition so as to prevent drying of the droplets at the print head nozzle.

Certain printing inks have a slow drying characteristic and have been used in print heads along with the use of absorbent type paper so that the paper can take care of part of the problem of the slow drying ink. A disadvantage of the use of such slow drying ink and absorbent paper is that the behavior of the ink and paper causes irregular dot patterns and distorted characters.

Certain other printing inks having quick drying characteristics have been used on high quality papers and wherein these inks include organic solvents, such as ketone or alcohol along with water and a dye. However, such printing inks having an organic solvent base tend to dry or evaporate at the print head nozzle or within the print head itself or even within the ink supply system. It has been found that in the case of printing inks which consist primarily of water and ethylene glycol that the water has a tendency to evaporate or to slowly permeate through the wall of the ink supply conduit or channel.

Since it is common practice to provide a polyvinyl chloride tubing for carrying the printing ink from a reservoir or like supply to the print head, it is advantageous to use a printing ink having a formulation whereby permeation of the water through the wall of the tubing has minimum effect on the operation of the ink jets or nozzles. One area of concern has been the effect of a change in the condition of the printing ink in an ink jet printer which has been sitting idle for an extended period of time. Several suggestions for minimizing evaporation of the water have been the use of a printing ink having a low vapor pressure, a flexible and substantially water impermeable tube or conduit, and a tube or conduit having a relatively large wall thickness.

Representative documentation in the area of ink jet printing and conditioning of the ink includes U.S. Pat. No. 4,234,885, issued to G. W. Arway on Nov. 18, 1980, which discloses a system for controlling the flow of pressurized liquid to a print head through an elastic conduit and including an outer conduit to form a pressurizable jacket surrounding the inner conduit and having pressure control means to prevent dribbling or drooling of liquid at the print head immediately following shut off.

SUMMARY OF THE INVENTION

The present invention relates to ink jet printing, and more particularly, to means for preventing or at least minimizing evaporation of water from printing ink in the ink supply system. It is common practice to use a flexible conduit or tube to carry the printing ink from a supply reservoir, which is normally fixed in location or position, to the ink jet print head which normally moves in side-to-side manner across the paper or like record media. The flexible conduit or tube is usually made from porous material which allows certain fluids, such as water, to permeate through the wall of the conduit. Since some of the printing inks include water as an important ingredient thereof, the composition of the ink changes as water is allowed to pass through the wall of the conduit.

In accordance with the present invention, there is provided means for preventing gain or loss of material to or from the printing ink and for maintaining the composition of the ink in a substantially constant condition. A reservoir of printing ink is associated with an ink jet print head in a manner wherein a small diameter flexible tube has one end thereof immersed in the ink and has the other end secured to the inlet of the print head. A larger diameter flexible tube having its wall spaced from the small tube is connected with the atmosphere within the ink reservoir and with a supporting wall for the print head. The small diameter tube is thus carried in an atmosphere wherein the ink vapor throughout the length of the small tube is essentially the same as the ink vapor within the reservoir. Passage of any ink constituent through the porous wall of the small tube is rendered negligible by reason of the substantially equal concentration of ink vapor along the larger tube and the composition of the printing ink thereby remains constant. The large diameter flexible tube, in effect, serves as an extension of the atmosphere within the ink reservoir to maintain an appropriately vaporous condition surrounding the small diameter, ink-carrying tube.

In view of the above discussion, the principal object of the present invention is to provide means for preventing or at least limiting the flow of one or more ingredients of printing ink through the wall of an ink-carrying conduit.

Another object of the present invention is to provide means for maintaining the composition of the printing ink in substantially constant condition in the printing system.

An additional object of the present invention is to provide an ink-carrying conduit in an atmosphere of substantially constant vapor content.

A further object of the present invention is to provide a flexible wall enclosure spaced from an ink-carrying conduit and exposing such conduit to an environment essentially the same as that of the ink reservoir.

Additional advantages and features of the present invention will become apparent and fully understood from a reading of the following description taken together with the annexed drawing.

BRIEF DESCRIPTION OF THE DRAWING

The single FIGURE shows a diagrammatic view, partly in section, of a printing system incorporating the subject matter of the present invention.

DESCRIPTION OF THE PREFERRED EMBODIMENT

As seen in the single FIGURE of the drawing, an ink reservoir 10 contains a supply of printing ink 12 which is sufficient for printing in excess of several million characters. A length of flexible tubing 14, having a fairly constant wall thickness, is immersed at one end 16 thereof in the ink 12 and is securely connected at the other end 18 to an ink jet print head 20 of the well-known tubular transducer type. The print head 20 includes a body portion 22 of cylindrical form having a glass tube 24 or passageway through the body portion and terminating in a nozzle 26 for ejecting a droplet 28 of printing ink to be applied to record media 30, which media may be in the form of paper or the like and supported in suitable manner around a drum or from a platen (not shown). A filter-type vent 32 is provided in the top of the reservoir 10 and a flange-type outlet 34 is formed in one side thereof and through which passes the flexible tube 14.

The print head 20 may be of a type as disclosed in Arndt, U.S. Pat. No. 3,832,579, appropriate for and commonly used in ink jet printing operations, and which includes a piezoelectric device or tubular type transducer 36 for causing ejection of the ink droplets 28, either in synchronous or asynchronous manner from the print head nozzle 26. The ink droplets 28, so produced from the nozzle 26, are of essentially the same or constant in size and are normally ejected at a constant velocity. Leads 38 and 40 are appropriately connected to the print head 20 for actuating the transducer 36 so as to cause ejection of ink droplets 28 in well-known manner.

A large diameter flexible tube 42 is securely connected at one end 44 thereof to the flange-type outlet 34 and at the other end 46 to a flange portion 48 of a print head supporting wall member 50. The wall member 50 includes an aperture 52 therethrough for appropriately sealing and supporting the glass tube 24.

The tubing 14, which may be made of a polyvinyl chloride material, one of which is known by the name TYGON and manufactured by Norton Chemical Company, is of a small diameter or bore for carrying the printing ink 12 from the reservoir 10 to the print head 20. The tube 42 is of much larger diameter and may be made of similar flexible plastic material. The dimensions of the outlet 34 and of the tube 42 provide a space 54 between the two tubes which is an extension of the ink vapor-filled atmosphere in the reservoir 10.

A common formulation or mixture for printing inks includes approximately 85 percent ethylene glycol and 15 percent water along with a coloring dye. Since it has been found that water slowly permeates through the wall of the tubing 14 with a rate which depends on the humidity outside such tubing, the printing ink, which is made up of significant percentage of water, slowly changes composition. When the tube 42 is properly sized to provide the space 54, the entire length of the tube 14 is essentially within the ink vapor of the atmosphere of the reservoir 10. It is seen that any water which passes through the wall of the tube 14, by reason of being in substantially the same atmosphere as that of the reservoir 10, may permeate in either direction through the wall of the tube, that the same atmosphere substantially minimizes the flow of water through the wall of tube 14, or that such atmosphere may essentially end any flow of water and thereby maintain the same ink composition throughout the printing system. While there may be a slight amount of evaporation of water from the entire system, including the permeation of water through the walls of the reservoir 10 and the wall of the tube 42, the rate of change of the composition of the ink is negligibly small.

It is thus seen that herein shown and described is means for preventing or at least minimizing the evaporation of ink in an ink jet printing system wherein a small diameter ink-carrying conduit or tube is disposed within an enclosure in the form of a large diameter conduit or tube which large tube, in effect, is an extension of the ink supply, and thus the small tube is contained in an atmosphere of ink vapor. The apparatus of the present invention enables the accomplishment of the objects and advantages mentioned above, and while a preferred embodiment has been disclosed herein, variations thereof may occur to those skilled in the art. It is contemplated that all such variations not departing from the spirit and scope of the invention hereof, are to be construed in accordance with the following claims.

We claim:

1. Ink evaporation prevention means comprising
means containing a supply of ink,
means operably associated with said ink supply means for ejecting ink in droplet form,
means for carrying ink from said ink supply means to said ink ejecting means, and
means operably connected with the ink supply means and providing an ink vapor environment for said ink carrying means between the ink supply means and the ink ejecting means of a condition substantially corresponding with the ink vapor environment within the ink supply means.

2. The subject matter of claim 1 wherein the containing means is a reservoir having a supply of ink providing a high relative humidity.

3. The subject matter of claim 1 wherein the ink ejecting means is a tubular transducer.

4. The subject matter of claim 1 wherein the ink carrying means is a small diameter tube.

5. The subject matter of claim 1 wherein said environment providing means comprises an enclosure connected as an extension of the ink supply means along the ink carrying means.

6. The subject matter of claim 1 wherein said environment providing means comprises a large diameter tube surrounding said ink carrying means and providing a space therearound.

7. The subject matter of claim 1 wherein said ink carrying means is a small diameter tube and said environment providing means is a large diameter tube surrounding said small diameter tube and providing a space therearound.

8. The subject matter of claim 1 wherein said ink carrying means is a tube having one end thereof immersed in the ink and said environment providing means is a larger tube having one end connected to the ink supply means so as to provide a space between the tubes.

9. Means for minimizing evaporation of ink in an ink supply system comprising
means containing a supply of ink,
means utilizing ink in printing operation,
means for carrying ink from said ink supply means to said ink utilizing means, and
means operably connected with said ink supply means and with said ink utilizing means and extending therebetween for enveloping said ink carrying means in an ink vapor environment substantially corresponding with the ink vapor environment of said ink supply means.

10. The subject matter of claim 9 wherein said ink supply means is a reservoir having a supply of ink providing a vaporous condition.

11. The subject matter of claim 9 wherein the ink utilizing means is an ink jet print head.

12. The subject matter of claim 9 wherein the ink carrying means is a small diameter tube.

13. The subject matter of claim 9 wherein the enveloping means comprises an enclosure for the ink carrying means along a portion of the length thereof.

14. The subject matter of claim 9 wherein the enveloping means is a large diameter tube surrounding the ink carrying means and providing a space therearound.

15. The subject matter of claim 9 wherein said ink carrying means is a small tube and said enveloping means is a large tube disposed to provide a space between the walls of the respective tubes.

16. In an ink jet printer,
means containing a supply of ink,
means operably associated with the ink supply means for ejecting ink in printing operation,
means carrying ink from the ink supply means to the ink ejecting means, and
means operably connected with the ink supply means and creating an ink vapor atmosphere for the ink carrying means whereby the ink therein is maintained in an environmental condition substantially corresponding with the environmental condition in the ink supply means for preventing change in composition of ink in the carrying means.

17. In the printer of claim 16 wherein the ink supply means is a reservoir having a supply of ink providing a vaporous environmental condition.

18. In the printer of claim 16 wherein the ink ejecting means is a piezoelelectric transducer.

19. In the printer of claim 16 wherein the ink carrying means is a small diameter tube.

20. In the printer of claim 16 wherein the atmosphere creating means comprises a large diameter tube connected with the ink supply means and provides a space between the wall of the tube and the ink carrying means.

21. Means for maintaining ink constituency comprising
ink supply means, a print head operably associated with the ink supply means for utilizing the ink, means carrying ink from the supply means to the print head, and means operably connected with the ink supply means and with the print head and extending the ink vapor pressure environment of the ink supply means therebetween.

22. The subject matter of claim 21 wherein the ink supply means is a reservoir having a supply of ink of substantially consistent material content.

23. The subject matter of claim 21 wherein the ink carrying means is a small diameter tube.

24. The subject matter of claim 21 wherein the ink environment extending means is a large diameter tube surrounding the ink carrying means and providing a space therearound.

* * * * *